(12) United States Patent
Ito et al.

(10) Patent No.: US 6,562,292 B2
(45) Date of Patent: May 13, 2003

(54) METHOD FOR MANUFACTURING HIGH-PRESSURE PHASE MATERIAL

(75) Inventors: Kenji Ito, Aichi-ken (JP); Tomoaki Hata, Aichi-ken (JP); Ikuo Sakakibara, Handa (JP); Katsuhiko Takahashi, Aichi-ken (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 09/999,014

(22) Filed: Nov. 1, 2001

(65) Prior Publication Data

US 2002/0061276 A1 May 23, 2002

(30) Foreign Application Priority Data

Nov. 21, 2000 (JP) ........................................ 2000-354316

(51) Int. Cl.⁷ ................................................. B22F 3/08
(52) U.S. Cl. .......................................... 419/66; 423/446
(58) Field of Search .............................. 419/26, 45, 66; 423/446

(56) References Cited

U.S. PATENT DOCUMENTS

| | | | | |
|---|---|---|---|---|
| 4,788,166 A | * | 11/1988 | Araki et al. | 501/96 |
| 5,200,372 A | * | 4/1993 | Kuroyama et al. | 501/96 |
| 5,443,605 A | * | 8/1995 | Suzuki et al. | 1/307 |
| 5,536,485 A | * | 7/1996 | Kume et al. | 423/446 |
| 5,569,862 A | * | 10/1996 | Kuroyama et al. | 75/238 |
| 6,001,758 A | * | 12/1999 | Fukaya et al. | 501/96.4 |
| 6,008,153 A | * | 12/1999 | Kukino et al. | 501/96.4 |

FOREIGN PATENT DOCUMENTS

| JP | 47-34597 | 8/1972 | |
|---|---|---|---|
| JP | 52-4511 | 2/1977 | B01J/3/06 |

* cited by examiner

*Primary Examiner*—Daniel J. Jenkins
(74) *Attorney, Agent, or Firm*—Fish & Richardson P.C.

(57) ABSTRACT

The present invention relates to a method for manufacturing a highly purified diamond. In the method, a copper powder having purity 99.8% or more and having an acid-insoluble impurity concentration at 50 ppm or less, and graphite are mixed at first. The mixture of the copper powder and graphite is loaded into a sample tube. The sample tube is placed in an explosive tube. Explosive is loaded in the surrounding of the sample tube. Graphite is shock-compressed by the detonation of the explosive to yield diamond.

8 Claims, 2 Drawing Sheets

METHOD FOR MANUFACTURING HIGH-PRESSURE PHASE MATERIAL

BACKGROUND OF THE INVENTION

The present invention relates to a method for manufacturing a high-pressure phase material, in particular, to a method for manufacturing high-pressure phase boron nitride and diamond by using shock compression.

Japanese Patent Publication Nos. Showa 47-34597 and 52-4511 disclose methods for manufacturing high-pressure phase boron nitride and diamond. In the conventional methods, high-pressure phase product (diamond) was manufactured from low-pressure phase starting material (graphite) by using a shock pressure produced by explosion of explosive or by the collision caused by accelerated flyer.

Rapid quenching of the high-pressure phase product is essential in the conventional manufacturing methods. The low-pressure phase starting materials, such as graphite and boron nitride, are compressed by a shock wave to elevate the temperature, which transfers the phase into the high-pressure phase, such as high-pressure phase boron nitride and diamond. However, the duration of the state having the elevated temperature and the high pressure, obtained by the shock wave, is extremely short, like as between several micro-seconds and several tens of micro-seconds, and the pressure immediately drops to the atmospheric pressure. On the other hand, the heat generated by the shock pressure remains on the high-pressure phase product, even after the pressure has dropped. Accordingly, the high-pressure phase boron nitride and diamond undergo reverse phase transition. This decreases the conversion rate from the low-pressure phase starting material to the high-pressure phase product.

Accordingly, in order to increase the conversion rate towards the high-pressure phase product, a mixture of the low-pressure phase starting material powder and a metal powder (quenching medium) having large heat capacitance and high thermal conductivity is used. Metal powders, such as gold, platinum, silver, copper, iron, nickel and tungsten, are used as the quenching medium. The high-pressure phase product is manufactured through shock compression of the low-pressure phase starting material that is dispersed in the quenching medium matrix.

The metal powder acts as the quenching medium, and at the same time as the pressure medium. In the case where only the low-pressure phase starting material is compressed, without mixing the metal powder, the pressure applied to the low-pressure phase starting material is insufficient because the shock impedance is relatively low. Given that sufficient pressure is applied to the low-pressure phase starting material, the temperature of the low-pressure phase starting material becomes extremely high under the shock pressure. Because this increases the residual temperature on the low-pressure phase starting material, the conversion rate from the low-pressure phase starting material to the high-pressure phase product is reduced.

By mixing the powder of the low-pressure phase starting material and matrix metal having relatively high shock impedance, the shock impedance of the mixture is improved. As a result, sufficiently high pressure is applied to the low-pressure phase starting material. In addition, the residual temperature on the low-pressure phase starting material is decreased by the quenching effect of the matrix metal.

The powders of the high-pressure phase products (such as high-pressure phase boron nitride and diamond), which are manufactured through these conventional methods, are used in manufacture of: boron nitride cutting tool, and precision grinding processes of the semiconductor products, and components of precision machinery products. However, impurities in the high-pressure phase product powder can mix into the precision ground components in the precision grinding process. Such contamination by the impurities in the high-pressure phase product powder can cause adverse effects on the performance of the semiconductor products and the precision machinery products. Accordingly, grinding materials having high purity, which contains least possible impurity, are needed. However, it is difficult to remove the impurities from the high-pressure phase products in the purification process after shock pressurizing.

SUMMARY OF THE INVENTION

An object of the invention is to provide a method for manufacturing highly purified high-pressure phase products.

To achieve the above object, the present invention provides a method for manufacturing a high-pressure phase product. The method includes mixing a metal powder and a low-pressure phase starting material, forming a block by pressurizing the mixture of the metal powder and the low-pressure phase starting material, and shock-compressing the block. The metal powder has a purity of 99.8% or more and has a maximum concentration of any acid-insoluble impurity of 50 ppm or less.

Another perspective of the present invention is a method for manufacturing a high-pressure phase product by using shock compression. The method includes uniformly mixing a low-pressure phase starting material and a matrix metal powder having a purity of 99.8% or more and having a maximum concentration of any acid-insoluble impurity of 50 ppm or less, compressing the mixture of the matrix metal powder and the low-pressure phase starting material so as to make the porosity between 5 and 50%, containing the mixture and an explosive in a container, transferring the phase of the low-pressure phase starting material into high-pressure phase by exerting the shock pressure to the raw material mixture by detonating the explosive in the container, and purifying the phase-transferred product.

Other aspects and advantages of the present invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF PREFERRED EMBODIMENTS

Figure 1:
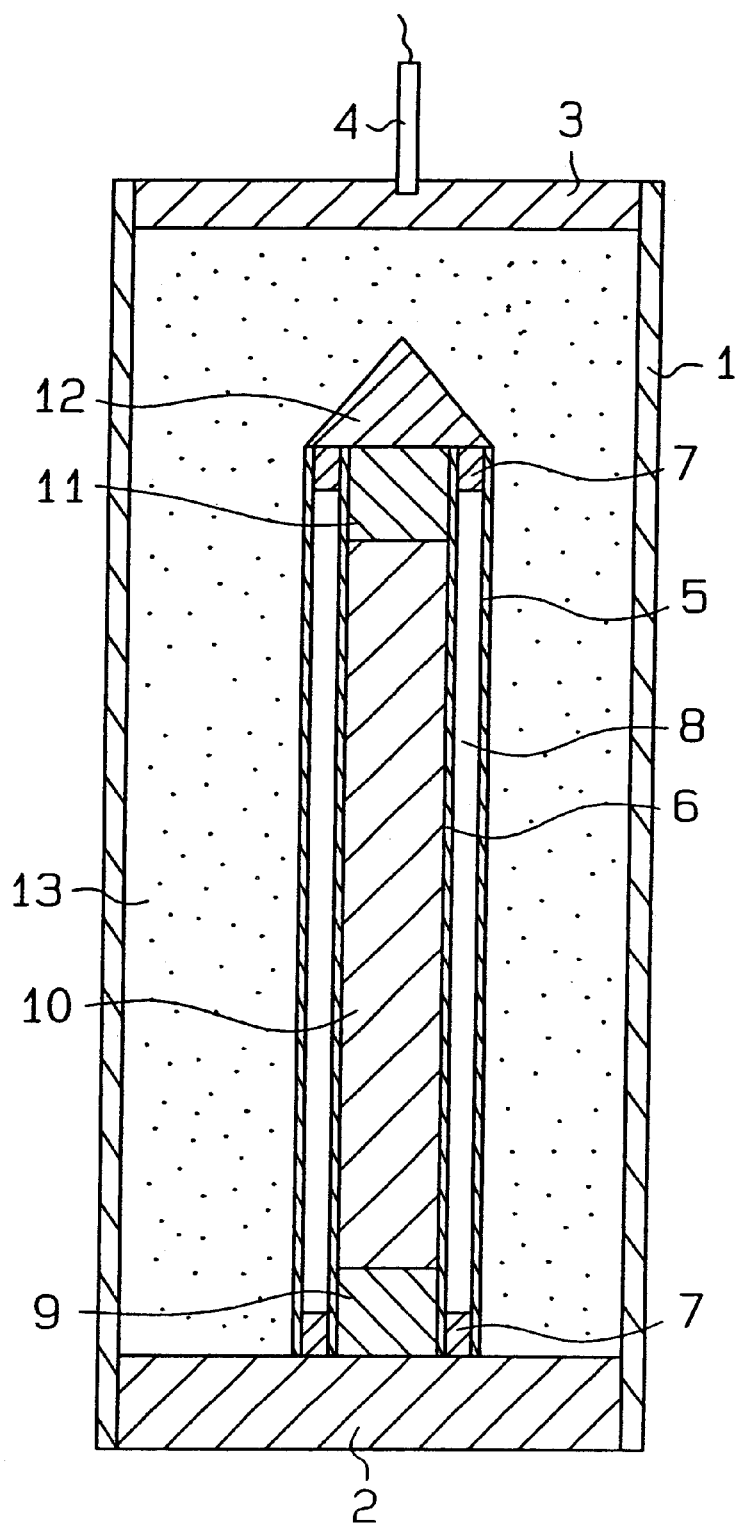
FIG. 1 shows a schematic cross-sectional view of a shock compression apparatus used in the manufacturing method according to an embodiment of the invention.

A method for manufacturing a high-pressure phase product according to an embodiment of the invention is described below.

The inventors have researched the relations between the purity of the high-pressure phase products and the purity of the matrix metals contained in the starting material. As a result, it became clear that highly purified high-pressure phase products (mixture of high-pressure phase boron nitride and unconverted low-pressure phase boron nitride; and diamond and unconverted carbon) were manufactured when matrix metal powder having reduced impurity was used.

In a manufacturing method of the high-pressure phase products according to one embodiment, the raw material mixture is prepared by mixing: a metal matrix powder having purity of 99.8% or more and having the acid-insoluble impurities concentration at 50 ppm or less; and a low-pressure phase starting material. The raw material mixture is formed into a block by pressurizing. The high-pressure phase product is obtained by applying shock pressure (dynamic pressure) to the block.

In one embodiment, selection of the low-pressure phase starting material, the purity of the metal matrix, the proportion of the metal matrix in the raw material mixture, the density of the pressurized block of the raw material mixture, and the porosity of the block are important.

If the low-pressure phase starting material is a carbon-containing material, it is preferred that the grain diameter is 100 $\mu$m or less and as small as possible, in order to improve the conversion rate to the high-pressure phase product. The carbon-containing materials that can be used are: natural graphite, such as flake graphite and amorphous graphite; artificial graphite; coke; carbon black; glassy carbon; carbonized organic materials; and carbon-containing compounds which yield carbon by pre-treatment, etc. Because natural graphite and coke can contain relatively large amount of impurities, it is preferred to perform pre-treatment, such as acid treatment, alkali treatment and heating, etc, in compliance with the types of the impurities.

If the low-pressure phase starting material is low-pressure phase boron nitride, the use of commercially available hexagonal boron nitride (hBN) as the raw material is desirable because of its low cost. Rhombohedral boron nitride (rBN) can also be used.

Matrix metal is a metal powder having purity of 99.8% or more and having the maximum concentration of 50 ppm or less of an acid-insoluble impurity such as tin oxide. A plurality of types of impurities is contained in an ordinary matrix metal. There are acid-insoluble impurities and acid-soluble impurities. One requirement of the matrix metal is a metal powder having the concentration of the acid-insoluble impurity contained at a largest amount at 50 ppm or less. When the purity of the metal powder is less than 99.8% and when the concentration of at least one of the acid-insoluble impurities exceeds 50 ppm, highly purified high-pressure phase products cannot be obtained.

As a matrix metal powder, atomized powder (powder obtained by atomization), electrolyzed powder and ground powder can be used. Spherical shape is preferable from the aspect of gap filling properties. Note however that in order to maintain the stability of the powder of the low-pressure phase starting material, spherical shaped metal powder and non-spherical shaped metal power may be combined. Desirable grain diameter of the matrix metal powder is between 0.1 and 1000 $\mu$m. Preferable matrix metals are powder of gold, platinum, silver, copper, iron, nickel and tungsten. Copper powder and iron powder are specifically desirable because of the readiness of chemical purification process and of the inexpensive cost.

Although any proportion of the matrix metal powder contained in the starting material may be adopted, it is preferably between 70 and 98 weight %, and more preferably between 80 and 98 weight %. Accordingly, the proportion of the low-pressure phase starting material within the starting material is preferably between 2 and 30 weight %, more preferably between 2 and 20 weight %. When the metal powder is less than 70 weight %, recovery of the product is more difficult because the mixed sample is overheated and the sample tube is liable to be damaged. The manufacture of the high-pressure phase product is possible in principle, even when the mixing proportion of the metal powder is 99.99 weight %. However, the manufacturing efficiency decreased because the high-pressure phase product yield decreased in compliance with the increase in the metal powder proportion. Therefore, the upper limit of the metal powder proportion is preferably 98 weight %.

In addition, it is preferred that the low-pressure phase starting material is uniformly mixed in the metal powder. The yield of the high-pressure phase product is improved in a uniformly mixed low-pressure phase starting material because the shock pressure is applied uniformly.

The mixed sample of the metal powder and the low-pressure phase starting material is formed into a block having a predetermined shape by using a mold. The formation of the mixed sample may adopt a hydraulic press. The porosity of the block is preferably between 5 and 50%. In order to obtain a block having porosity less than 5%, an expensive and special high-pressure press is required. When the porosity exceeds 50%, it is difficult to obtain a block having a predetermined shape, even when a forming assisting agent is added.

The porosity is related to the temperature rise of the mixed sample at the shock compression. The temperature rise in the mixed sample is large when the porosity is high, which melts the mixed sample and damages the container of the sample. The temperature rise of the mixed sample also becomes larger in compliance with the pressure at the shock compression. Accordingly, the explosive and the porosity are selected to cause an appropriate shock pressure and temperature rise. A mixture of a plurality of explosives may also be used.

The block is disposed in a metal container (explosive container). The ingredient of the metal container is preferably iron, copper, brass, stainless steel or chromium steel. The metal container is preferably a box shape or a tubular shape. The block in the metal container is shock-compressed by using shock compression apparatus. In particular, the block in the metal container is shock-compressed by the shock pressure (shock wave) incorporating high temperature and high pressure caused by the explosion of the explosive. A shock compression apparatus of Japanese Patent Publication No. Showa 47-34597 may be used for example, as the shock compression apparatus.

A shock compression apparatus used in one embodiment is described by referring to FIG. 1. The shock compression apparatus includes an explosive tube 1 made of metal, a bottom plate 2 having larger thickness than the explosive tube 1, a sheet-shape booster explosive 3 disposed at the top end of the explosive tube 1, and a detonator 4 stuck in the center of the top face of the booster explosive 3.

A driver tube 5 is provided in the upright position in the center of the top face of the bottom plate 2. Sample tube 6 is secured to the inside of the driver tube 5 through two fixing rings 7. A cavity 8 is defined between the driver tube 5 and the sample tube 6. The bottom opening of the sample tube 6 is sealed by the lower plug 9 and the top opening of the sample tube 6 is sealed by the upper plug 11. The mixture sample 10 of the low-pressure phase starting material and the matrix metal powder is loaded in the sample tube 6.

A conical cap 12 is placed on the top end of the driver tube 5 and the sample tube 6. The conical cap 12 prevents the shock wave directly traveling into the center of the sample tube 6, which was caused by detonation of the explosive 13 in the upper portion of the explosive tube 1. Explosive 13 is loaded into the explosive tube 1. Though various types of explosive 13 can be used, dynamite, ANFO (ammonium oil fuel explosive), hydrogen-containing explosive, HMX (high-melting explosive) and PBX (plastic bonded explosive) are preferable.

Detonator 4 is ignited when shock-compressing the mixed sample 10. The booster explosive 3 is triggered by the ignition of the detonator 4 to detonate the explosive 13. This generates a shock wave which propagates towards the center of the explosive tube 1 and the sample tube 6. The shock wave also propagates from the upper portion to the lower portion of the driver tube 5. In this way, the shock pressure acts on the driver tube 5, the sample tube 6 and the sample 10.

The mixed sample 10 is compressed by the shock pressure of 10 GPa or more. In order to improve the yield of the high-pressure phase product, the shock pressure is preferably 15 GPa or more. However, excess shock pressure is not desirable because it decomposes or melts the mixed sample 10 and makes the recovery of the product difficult.

The shock wave due to the explosion of the explosive 13 is exerted on the sample tube 6 through the driver tube 5 (a high-speed flyer). Besides those, the driver tube 5 may be omitted and the explosive 13 may be exploded in state where the sample tube 6 directly contacts the explosive 13. In this case, the shock wave due to the explosion of the explosive 13 is directly applied to the sample tube 6 containing the sample 10.

The sample 10 is recovered after shock-compression. Metal components are dissolved and removed from the sample 10. Accordingly, the shock-pressurized sample 10 is purified and recovered. In case where the matrix metal is iron powder, the sample 10 is purified by dissolving iron into hydrochloric acid. In case where the matrix metal is copper powder, the sample 10 is purified by dissolving copper into nitric acid or aqua regia.

Following advantages are obtained according to one embodiment.

The matrix metal is a metal powder having purity of 99.8% or more. Each acid-insoluble impurity contained in the metal powder is 50 ppm or less. A high-pressure phase product having a high purity to the extent that no peak of the impurity is observed in the X-ray diffraction analysis chart is obtained, by reducing the impurities within the matrix metal.

In the case where hexagonal boron nitride powder is used as the starting material and copper powder is used as the metal powder, a highly purified high-pressure phase boron nitride is obtained as a high-pressure phase product. In the case where graphite or a carbon-containing material is used as the low-pressure phase starting material, and copper powder, as the metal powder, a highly purified diamond is obtained as a high-pressure phase product.

An expensive and special high-pressure press is dispensable because the porosity of the block is set at between 5 and 50%. In addition, a block can be readily obtained without combining a forming assisting agent.

A high-pressure phase product is produced at a high yield because the content of the matrix metal is between 70 and 98 weight %, and the content of the low-pressure phase starting material is between 2 and 30 weight %.

EXAMPLES

The examples and the comparative examples of the invention are described below.

Example 1

A starting material mixture was obtained by mixing: low-pressure phase boron nitride 20 weight %; copper powder 80 weight % having average grain size 100 μm and purity 99.8%; and ethanol 2 weight %, in a ball mill. The acid-insoluble impurities within the copper powder were 50 ppm or less.

The starting material mixture was loaded in a sample tube 6 (outside diameter 30 mm, inside diameter 26 mm and length 350 mm) and was pressurized in the test tube. This formed a block having a shape corresponding to the shape of the test tube 6. The loading density of the starting material mixture was 6.0 g/cm$^3$, and the porosity was 20%. Plugs 9 and 11 made of mild steel were forced into both ends of the sample tube 6. A copper pipe for degassing is provided in the lower plug 9 though not shown in the figures.

Degassing treatment was performed by holding the sample tube 6 at 400° C. and 0.1 Pa for 2 hours. After degassing, the sample tube 6 was contained in a driver tube 5 and fastened through fixing ring 7. A conical cap 12 was placed on the driver tube 5. The driver tube 5 was placed in the center of the explosive tube 1 (outside diameter 76 mm, inside diameter 68 mm, and length 400 mm). The gap between the driver tube 5 and the explosive tube 1 was filled with the explosive 13 (detonation velocity 5400 m/s). Booster explosive 3 having electric detonator 4 was placed on the explosive 13.

The booster explosive 3 was triggered by ignition of the detonator 4. The explosive 13 was detonated from the upper towards lower of the explosive tube 1. The shock pressure was between 15 and 30 GPa. Shock-compressed crude product was recovered from the sample tube 6. The crude product was immersed into aqua regia (nitric acid: hydrochloric acid=1:3) to dissolve the copper, and the copper was removed by water-washing. Purified powdery product was obtained after drying. The result from X-ray diffraction analysis showed that the product was Wultzite boron nitride, and no impurity peak was observed in the X-ray diffraction analysis chart.

Example 2

A raw material mixture was obtained by mixing: natural graphite 10 weight %; copper powder 90 weight % having average grain diameter 100 μm and purity 99.8%; and ethanol 2 weight %, in a ball mill. The acid-insoluble impurity in the copper powder was 50 ppm or less. The raw material mixture was loaded in the sample tube 6 (outside diameter 27 mm, inside diameter 19 mm and length 240 mm) by using a mold, and then pressurized in the sample tube 6. This formed a block having a shape corresponding to the shape of the sample tube 6. The loading density of the raw material mixture was 6.5 g/cm$^3$ and the porosity was 20%. Plugs 9 and 11 made of mild steel were forced into both ends of the sample tube 6. A copper pipe for degassing is provided in the lower plug 9.

The sample tube 6 was fastened in a driver tube 5 (outside diameter 43 mm, inside diameter 36 mm, and length 240 mm) through a pair of fastening rings 7. A conical cap 12 was placed on the driver tube 5. Degassing treatment was performed by holding the driver tube 5 at 400° C. and 0.1 Pa for 2 hours. After degassing, the driver tube 5 was placed in the center of the explosive tube 1 (outside diameter 114 mm, inside diameter 105 mm, and length 280 mm). The gap between the driver tube 5 and the explosive tube 1 was filled with the explosive 13 (detonation velocity 6800 m/s). Booster explosive 3 having electric detonator 4 was placed on the explosive 13.

The booster explosive 3 was triggered by ignition of the detonator 4. In this way the sample 10 was shock-compressed. The shock pressure was between 15 and 30 GPa. Shock-compressed crude product was recovered from the sample tube 6. The crude product was immersed into aqua regia to dissolve the copper, and the copper was removed by water-washing. Powdery product was obtained after drying. The powdery product and lead oxide are mixed. The mixture was heated at 400° C. for 15 hours and unconverted carbon was oxidized and removed. Nitric acid was added to dissolve and remove lead. Purified product was obtained by water-washing.

Figure 2:
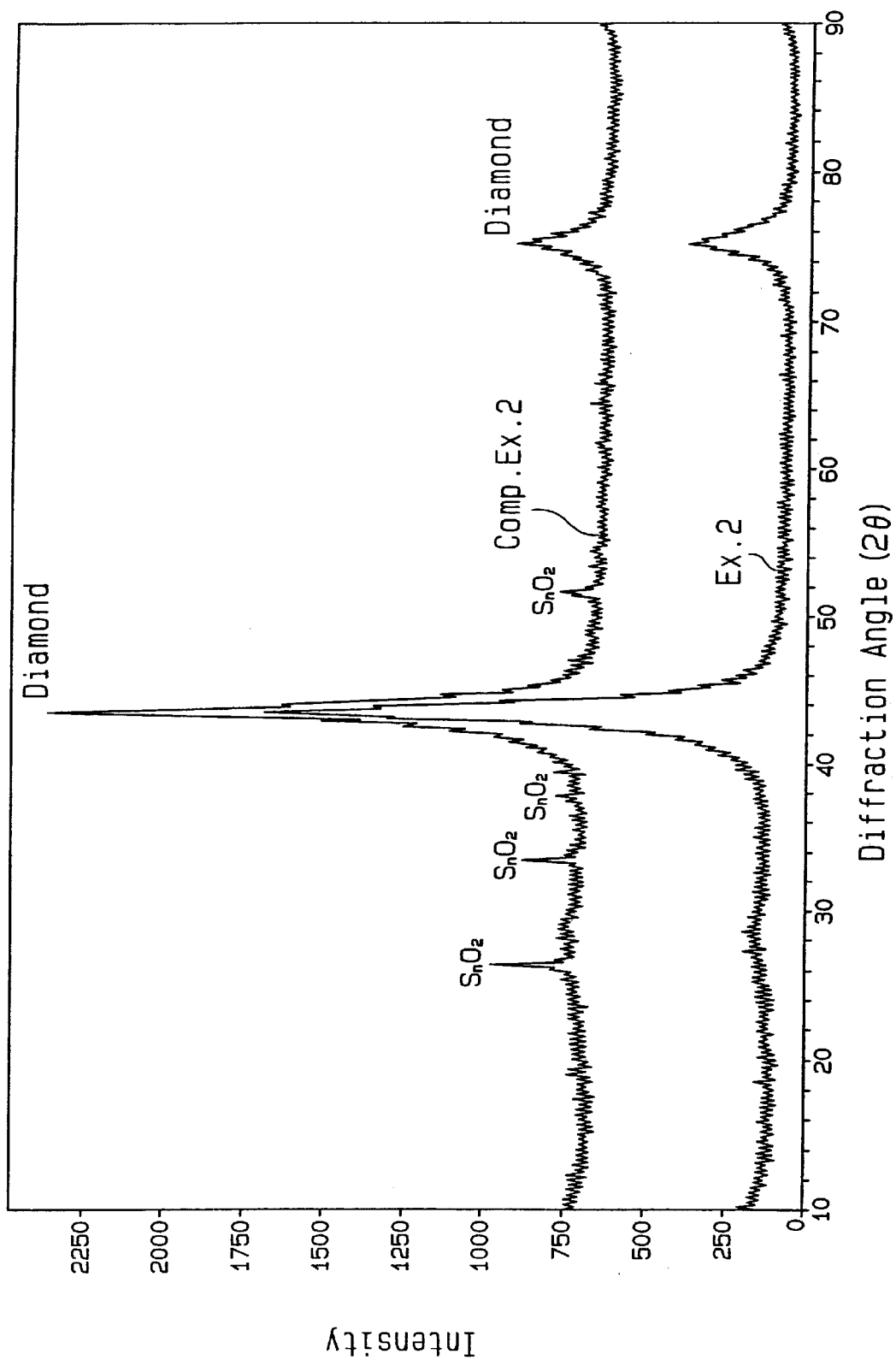
FIG. 2 shows X-ray diffraction profiles of the high-pressure phase products of Example 2 and Comparative Example 2.

X-ray diffraction analysis chart of the purified product of Example 2 is shown in FIG. 2. The product was diamond, and the peak of impurities was not observed.

Comparative Example 1

A raw material mixture was obtained by mixing: low-pressure phase boron nitride 20 weight %; copper powder 80 weight % having average grain diameter 100 $\mu$m and purity 99.5%; and ethanol 2 weight %, in a ball mill. Tin (Sn), which is an acid-insoluble impurity, was contained in the copper powder at 100 ppm or more. The raw material mixture was loaded in the sample tube 6 (outside diameter 30 mm, inside diameter 26 mm and length 350 mm) by using a mold, and then pressurized in the sample tube 6. This formed a block having a shape corresponding to the shape of the sample tube 6. The loading density of the raw material mixture was 6.0 g/cm$^3$ and the porosity was 20%. Plugs 9 and 11 made of mild steel were forced into both ends of the sample tube 6. A copper pipe for degassing is provided in the lower plug 9, though not shown in the figures.

Degassing treatment was performed by holding the sample tube 6 at 400° C. and 0.1 Pa for 2 hours. After the treatment, the sample tube 6 was placed in the center of the explosive tube 1 (outside diameter 76 mm, inside diameter 68 mm, and length 400 mm). The gap between the driver tube 5 and the explosive tube 1 was filled with the explosive 13 (detonation velocity 5400 m/s). Booster explosive 3 having electric detonator 4 was placed on the explosive 13.

The booster explosive 3 was triggered by ignition of the detonator 4 and the explosive 13 was detonated. In this way, the sample 10 was shock-compressed. The shock pressure was between 15 and 30 GPa. Shock-compressed crude product was recovered from the sample tube 6. The crude product was immersed into aqua regia (nitric acid: hydrochloric acid=1:3) to dissolve the copper, and the copper was removed by water-washing. Powdery product was obtained after drying. Peaks of Wultzite boron nitride and tin oxide were detected in the result from X-ray diffraction analysis. Accordingly, it was confirmed that the product contained a relatively large amount of impurities.

Comparative Example 2

A raw material mixture was obtained by mixing: natural graphite 10 weight %; copper powder 90 weight % having average grain diameter 100 $\mu$m and purity 99.5%; and ethanol 2 weight %, in a ball mill. Tin (Sn), which is an acid-insoluble impurity, was contained in the copper powder at 100 ppm or more. The raw material mixture was loaded in the sample tube 6 (outside diameter 27 mm, inside diameter 19 mm and length 240 mm) by using a mold, and then pressurized in the sample tube 6. This formed a block having a shape corresponding to the shape of the sample tube 6. The loading density of the raw material mixture was 6.5 g/cm$^3$ and the porosity was 20%. Plugs 9 and 11 made of mild steel were forced into both ends of the sample tube 6. A copper pipe for degassing is provided in the lower plug 9, though not shown in the figures.

The sample tube 6 was fastened in a driver tube 5 (outside diameter 43 mm, inside diameter 36 mm, and length 240 mm) through a pair of fastening rings 7. A conical cap 12 was placed on the driver tube 5. Degassing treatment was performed by holding the driver tube 5 at 400° C. and 0.1 Pa for 2 hours. After degassing, the driver tube 5 was placed in the center of the explosive tube 1 (outside diameter 114 mm, inside diameter 105 mm, and length 280 mm). The gap between the driver tube 5 and the explosive tube 1 was filled with the explosive 13 (detonation velocity 6800 m/s). Booster explosive 3 having electric detonator 4 was placed on the explosive 13.

The booster explosive 3 was triggered by ignition of the detonator 4 and the explosive 13 was detonated. In this way, the sample 10 was shock-compressed. The shock pressure was between 15 and 30 GPa. Shock-compressed crude product was recovered from the sample tube 6. The crude product was immersed into aqua regia to dissolve the copper, and the copper was removed by water-washing. Powdery product was obtained after drying. The powdery product and lead oxide were mixed. The mixture was heated at 400° C. for 15 hours and unconverted carbon was oxidized and removed. Nitric acid was added to dissolve and remove lead. Powdery product was obtained by water-washing. Peaks of diamond and tin oxide were detected in the X-ray diffraction analysis chart of the product of Comparative Example 2. Accordingly, it was confirmed that the product contained a relatively large amount of impurities.

One embodiment may be altered as shown below.

The sample 10 may be shock-compressed by allowing a flyer driven at high speed to collide with the sample 10 by detonating the explosive.

In FIG. 1, at least one detonator 4 may be placed on the side face of the explosive tube 1 to detonate the explosive 13.

A spherical shaped explosive container, a driver container or a sample container may be used instead of the explosive tube 1, the driver tube 5 or sample tube 6. In this case, the sample 10 is loaded in the sample container in a spherical shape, and is compressed uniformly.

The present examples and embodiments are to be considered as illustrative and not restrictive, and the invention is not to be limited to the details given herein, but may be modified within the scope and equivalence of the appended claims.

What is claimed is:

1. A method for manufacturing a high-pressure phase boron nitride comprising:

mixing a copper powder and a hexagonal boron nitride powder, wherein the copper powder has a purity of 99.8% or more and has a maximum concentration of any acid-insoluble impurity of 50 ppm or less;

forming a block by pressurizing the mixture of the copper powder and the hexagonal boron nitride powder; and shock-compressing the block.

2. A method for manufacturing diamond comprising:

mixing a copper powder and a carbon-containing material, wherein the copper powder has a purity of 99.8% or more and has a maximum concentration of any acid-insoluble impurity of 50 ppm or less;

forming a block by pressurizing the mixture of the copper powder and the carbon-containing material; and shock-compressing the block to form a material containing diamond.

3. A method for manufacturing a high-pressure phase product by using shock compression, comprising the steps of:

uniformly mixing a low-pressure phase starting material and a matrix metal powder having a purity of 99.8% or more and having a maximum concentration of any acid-insoluble impurity of 50 ppm or less;

compressing the mixture of the matrix metal powder and the low-pressure phase starting material so as to make the porosity between 5 and 50%;

containing the mixture and an explosive in a container;

transferring the phase of the low-pressure phase starting material into high-pressure phase by exerting the shock pressure to the raw material mixture by detonating the explosive in the container; and purifying the phase-transferred product.

4. The manufacturing method according to claim 3, wherein the purification includes dissolving the acid-soluble impurities in the product into an acidic solution.

5. The manufacturing method according to claim 4, wherein the matrix metal powder is copper powder, and the acidic solution is aqua regia.

6. The manufacturing method according to claim 5, wherein the starting material is hexagonal boron nitride powder, and the product is high-pressure phase boron nitride.

7. The manufacturing method according to claim 5, wherein the starting material is graphite, and the product is diamond.

8. The manufacturing method according to claim 3, wherein the proportion of the matrix metal powder within the mixture is between 70 and 98 weight %.

* * * * *